United States Patent

Kuroki et al.

[11] Patent Number: 5,825,636
[45] Date of Patent: Oct. 20, 1998

[54] PLANAR LUMINESCENT DEVICE AND PLANAR LUMINESCENT ELEMENT

[75] Inventors: Michio Kuroki, Tokyo; Tokio Mizukami; Yoshiyuki Nakaya, both of Kanagawa-ken, all of Japan

[73] Assignee: International Manufacturing and Engineering Services Co., Ltd., Kanagawa-Ken, Japan

[21] Appl. No.: 606,211

[22] Filed: Feb. 23, 1996

[30] Foreign Application Priority Data

Mar. 1, 1995 [JP] Japan .................................. 7-042122

[51] Int. Cl.⁶ ...................................................... F21V 13/04
[52] U.S. Cl. ...................... 362/309; 362/328; 362/330; 362/352; 362/450
[58] Field of Search .............................. 40/539, 542, 546, 40/564, 571, 573, 582; 349/61, 62, 64, 67; 362/31, 84, 98, 307–309, 327, 328, 330, 343, 352, 433, 450

[56] References Cited

U.S. PATENT DOCUMENTS

| | | |
|---|---|---|
| 1,377,161 | 5/1921 | Vanderbeek ................................ 40/582 |
| 4,118,759 | 10/1978 | Hauville ..................................... 362/98 |
| 4,409,646 | 10/1983 | Baliozian ................................. 362/301 |
| 4,587,755 | 5/1986 | Sunshine ................................... 40/571 |
| 4,874,228 | 10/1989 | Aho et al. ................................. 349/64 |
| 5,128,850 | 7/1992 | Juodvalkis ............................... 362/352 |
| 5,167,508 | 12/1992 | McTaggart ................................. 362/98 |

Primary Examiner—Alan Cariaso
Attorney, Agent, or Firm—McCormick, Paulding & Huber

[57] ABSTRACT

A planar luminescent device useful as a backlight for liquid crystal display. The planar luminescent device comprises a synthetic resin sheet having at least one fold and a plurality of sheet sections foldable along this fold. A sheet holder is adapted to hold the sheet sections of the sheet, folded along the fold, in a predetermined accordion-like folded position. A reflective layer and a light emitting layer are respectively provided on the sheet sections defining opposite ends of the sheet. A light source emits light rays towards the reflective layer.

10 Claims, 6 Drawing Sheets

PLANAR LUMINESCENT DEVICE AND PLANAR LUMINESCENT ELEMENT

BACKGROUND OF THE INVENTION

1. Field of the Invention

The present invention relates to a planar luminescent device and a planar luminescent element.

2. Description of Related Art

A planar luminescent device has been used in various applications, particularly as a backlight device used to light a liquid crystal panel of a liquid crystal display from behind. As shown in FIGS. 8 and 9, a conventional backlight device 1 basically comprises a light guide plate 2 having a wedge-shaped cross-section, a reflective sheet 3 laid on the rear side of the light guide plate 2, a diffusive plate 4 and a pair of prism sheets 5, 6 laid on the front side of the light guide plate 2, and a cylindrical light source (fluorescent lamp) 7 positioned within a thicker end of the light guide plate 2. The light guide plate 2 is usually made of transparent acrylic resin and is provided on its rear side with a diffusive pattern 2*a* selected so as to uniformalize light rays reflected on the reflective sheet 3. Behind the cylindrical light source 7, there is provided a cylindrical reflector 7*a* having a substantially semi-circular (or semi-elliptical) cross-section. To serve as condensing means the prism sheets 5 and 6 have 90° angular sections. The cylindrical light source 7 may also be of a dual type, i.e., it may comprise a pair of halves placed laterally on opposite sides of the reflective sheet 3.

With such a conventional backlight device 1, light rays emitted from the cylindrical light source 7 into the light guide plate 2 are repeatedly reflected on the front and rear sides of the light guide plate 2. The portion of the light rays passing beyond the critical angle passes (upward as viewed in FIG. 8) through the diffusive plate 4 and the prism sheets 5, 6. Due to the condensing function of the prism sheets 5, 6 the central luminance of the planar luminescent body is increased.

However, the conventional backlight device 1 has been disadvantageous in that the components thereof, particularly the light guide plate 2 as well as the prism sheets 5, 6 inevitably require unacceptably high unit costs and the cost required for assembly and for positioning these components is also relatively high, contrary to a desired cost reduction, necessary for liquid crystal displays to be mass-produced. Additionally, weight reduction is required when it is desired that the liquid crystal display should be used in a laptop computer.

In view of the above-mentioned problems inherent to the conventional backlight, it is a primary object of the present invention to obtain a planar luminescent device and a planar luminescent element having a simplified construction thus leading to a drastic reduction in the costs of manufacture and assembly. It is another object of the present invention to obtain a lightweight planar luminescent device and a light-weight planar luminescent element.

SUMMARY OF THE INVENTION

The present invention is based on the fact that the basic element of the planar luminescent device (i.e., planar luminescent element) is constructed from a foldable synthetic resin sheet.

More specifically, the planar luminescent element of the invention comprises a synthetic resin sheet having at least one fold and a plurality of sheet sections foldable along this fold, wherein the respective sheets are formed on their front and/or rear sides with optically active layers adapted to deflect light rays such as a reflective layer, a diffusive layer, a Fresnel lens layer and a prism sheet layer. Of these optically active layers, the reflective layer and a light emitting layer (luminescent layer) may be provided, for example, on the sheet sections defining opposite ends of the synthetic sheet folded along the fold, respectively.

The fold serves as a guide or a positioning reference along which the synthetic resin sheet is folded and may be realized in the form of a thinned line, or a U-shaped or square U-shaped recess.

The reflective layer may be formed by coating the sheet section with reflective film or laying a reflective sheet on the sheet section.

The light distribution characteristic required for the planar luminescent body may be selected by an appropriate combination of characteristics presented by the optically active layers such as the reflective layer, the diffusive layer, the Fresnel lens layer and the prism sheet layer provided on the front and/rear sides of each sheet section. The respective optically active layers may be obtained in accurate configurations by stamping the synthetic resin sheet.

More specifically, these optically active layers provided on the sheet sections may be arranged, for example, in the order of the reflective layer, the diffusive layer, a first prism sheet layer and a second prism sheet layer.

Alternatively, these optically active layers may be arranged in the order of the reflective layer, the diffusive layer and the Fresnel lens layer.

The planar luminescent device using the planar luminescent element mentioned above further comprises sheet holders adapted to hold the sheet sections of the sheet folded along the fold at a predetermined folded position; and a light source which emits light rays towards the reflective layer.

The planar luminescent device may be assembled merely by folding the sheet along the fold, holding it in the sheet holders and placing the light source at a predetermined position. The foldable sheet as well as the sheet holders may be produced at a relatively low cost, thus leading to a reduction in the total manufacturing cost of the planar luminescent device.

According to an aspect of the present invention there is provided a planar luminescent device which comprises a synthetic resin sheet having at least one fold and a plurality of sheet sections foldable along this fold. A sheet holder is adapted to hold the sheet sections of the sheet folded along the fold in a predetermined accordion-like folded position. A reflective layer and a light emitting layer are respectively provided on the sheet sections defining opposite ends of the sheet folded and held by the sheet holder. A light source emits light rays towards the reflective layer.

According to another aspect of the present invention there is provided a planar luminescent element comprising a synthetic resin sheet having at least one fold and a plurality of sheet sections foldable along the fold. At least one optically active layer is provided on at least one of the front or rear sides of the sheet sections, to change the direction of light incident upon the same.

According to another aspect of the present invention, there is provided a planar luminescent device which comprises a synthetic resin sheet having at least two folds and at least three sheet sections, foldable along the folds, having the same rectangular shape. A sheet holder is adapted to hold the sheet sections folded along the fold in a predetermined accordion-like folded position. A reflective layer and a light emitting layer are respectively provided on the sheet sections defining opposite ends of the sheet folded and held by the sheet holder. A light source is provided at one side of the accordion-like folded sheet, parallel with the fold to emit light toward the reflective layer from an open end of the folded sheet sections.

The present disclosure relates to subject matter contained in Japanese Patent Application No. 7-42122 (filed on Mar. 1, 1995) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

The present invention will be better understood from the following description of the embodiments made in reference to the accompanying drawings.

Figure 1:
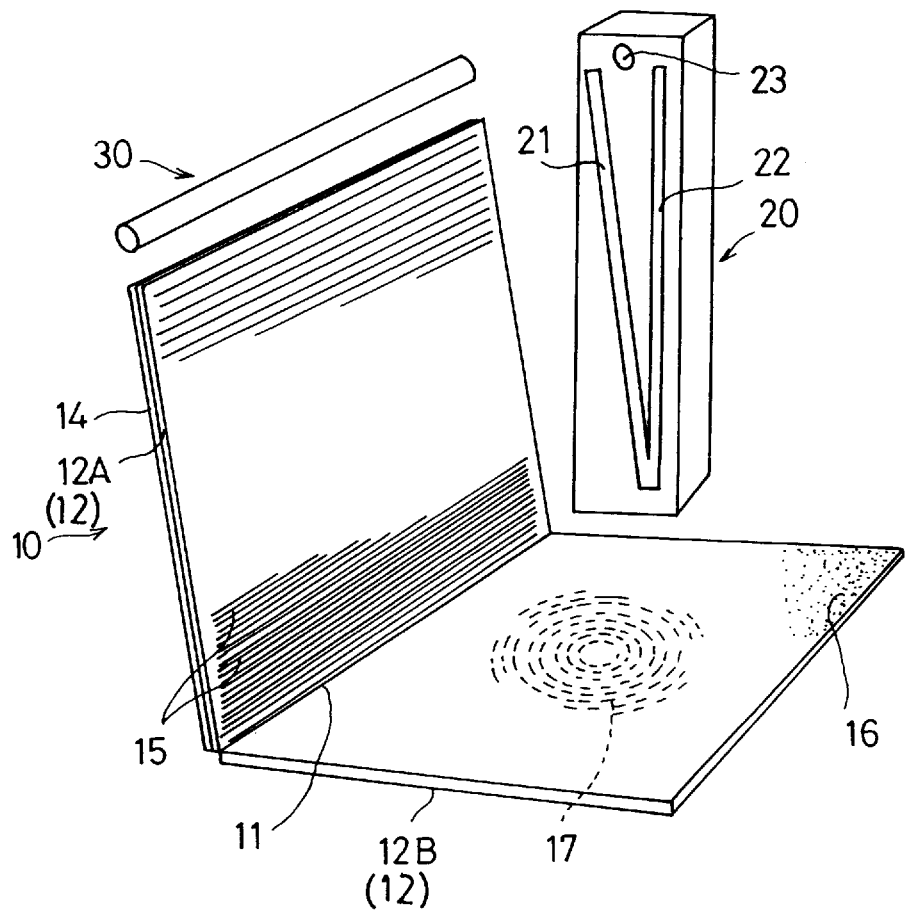
FIG. 1 is an exploded perspective view showing an embodiment of the planar luminescent device constructed according to the present invention.
Figure 2:
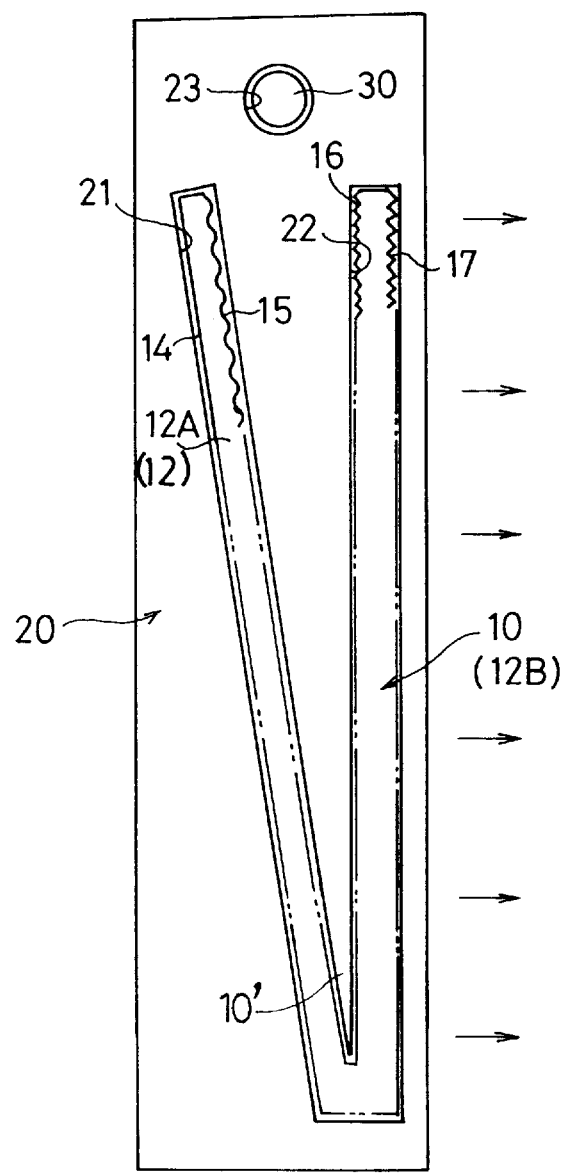
FIG. 2 is a sectional view showing the device of FIG. 1 in its assembled state.

FIGS. 1 and 2 show a first embodiment of the planar luminescent element and the planar luminescent device constructed according to an aspect of the present invention. A synthetic resin sheet 10 is foldable along a fold 11 of a pair of rectangular sheet sections 12A and 12B. The sheet section 12A is provided on its outer side with a reflective film 14 and on its inner side with a diffusive pattern 15, for example, coated thereon by vaporization. It should be noted here that the term inner sides refers to those sides of the sheet sections 12A, 12B that have been folded along the fold 11 towards each other. It should also be understood that the reflective film 14 may be replaced by a separate reflective sheet adhesively bonded to the sheet section 12A. The fold 11 is formed, for example, by thinning or perforating the sheet 10 along this line so that the pair of sheet sections may be put one upon the other in a predetermined positional relationship, i.e., the fold 11 is used to position the sheet sections.

The sheet section 12B is formed on its inner side with a diffusive layer 16 and on its outer side with a Fresnel lens layer 17.

The synthetic resin sheet 10 is folded along the fold 11, as has been described above, and is then held in this folded state by a pair of holders 20 provided laterally on both sides of the sheet 10 (note that only one of the holders is shown in the drawings). Each of these holders 20 has holding grooves 21, 22 adapted to position the respective sheet sections 12A, 12B and a supporting hole 23 adapted to receive an associated end of a cylindrical light source 30. The cylindrical light source 30 is positioned between free ends of the respective sheet sections 12A, 12B. The configuration and the angle defined between the holding grooves 21, 22 is previously selected so that a desired light distribution characteristic may be provided by the sheet 10. The sheet 10 is flexible so that, if desired, the holding groove 21 and/or the holding groove 22 may be curved in shape.

The above-mentioned device of the present invention is assembled by inserting both ends of the sheet sections 12A, 12B into the respective holding grooves 21, 22 and then inserting opposite ends of the cylindrical light source 30 into the respective receiving holes 23 of the sheet holders 20, as shown in FIG. 2. When the cylindrical light source 30 is switched on, light rays emitted from the cylindrical light source 30 are reflected by the reflective film 14 of the sheet section 12A before passing through a diffusive pattern 15, a diffusive layer 16 and a Fresnel lens layer 17 in this order. The Fresnel lens layer 17 serves as a luminescent layer. Depending on the light distribution characteristic desired, the pattern of the diffusive pattern 15, the diffusion degree of the diffusive layer 16 and the focal distance of the Fresnel lens layer 17 can be decided. It is also possible, without departing from the scope of the present invention, to provide a dual type of cylindrical light source 30 comprised of a pair of halves placed on either side of the foldable sheet 10.

Instead of the reflective film 14, aluminium powder is appliable to the inner or outer surface of the sheet section 12A by, for example, coating or evaporation coating the same. In addition, it is possible to insert small irregular-reflection particles at the bottom 10' of the folded sheet sections 12A and 12B to ensure a good diffusion efficiency.

Figure 3:
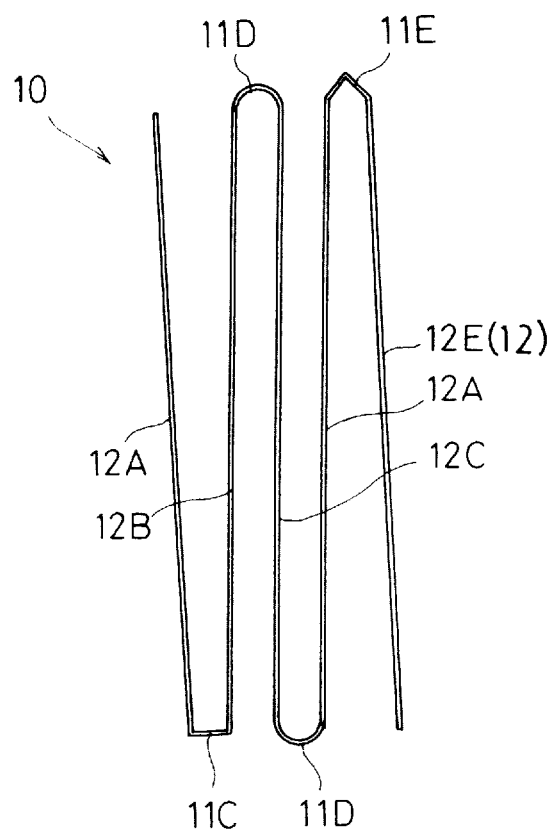
FIG. 3 is a side view showing alternative configurations of folds along which the planar luminescent element of the present invention is folded.

FIG. 3 shows the case in which five sheet sections 12 are connected successively by the fold 11 one to another. The fold 11, along which the respective sheet sections are folded, may be selected from those having various cross-sections, such as, a square U-shaped cross-sectional fold 11C, a semi-circular cross-sectional fold 11D and a V-shaped cross-sectional fold 11E, as shown in FIG. 3. Although in FIG. 3 these folds are shown together on the single foldable sheet 10, it is also possible for the foldable sheet 10 to have only one type of fold.

Figure 4:
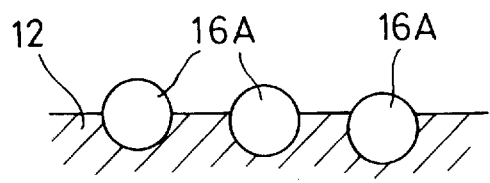
FIG. 4 is an enlarged sectional view showing a configuration of a diffusive layer used in the planar luminescent element of the present invention.

In order to improve the utilization efficiency of the light rays, the inner sides of the respective sheet sections may be formed as reflective layers, if desired. The diffusive layer 16 may be formed by stamping a fine irregular pattern or, as shown in FIG. 4, by embedding fine members 16A having different refractive indices, such as fine glass fiber threads or beads, into the sheet section to a predetermined depth or to random depths.

Figure 5:
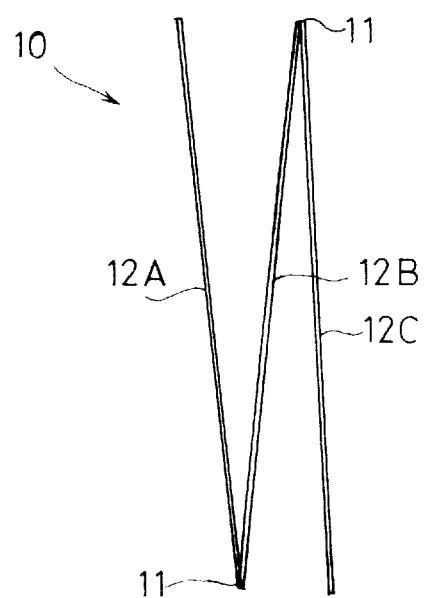
FIG. 5 shows an alternative configuration of the planar luminescent element constructed according to the present invention.
Figure 6:
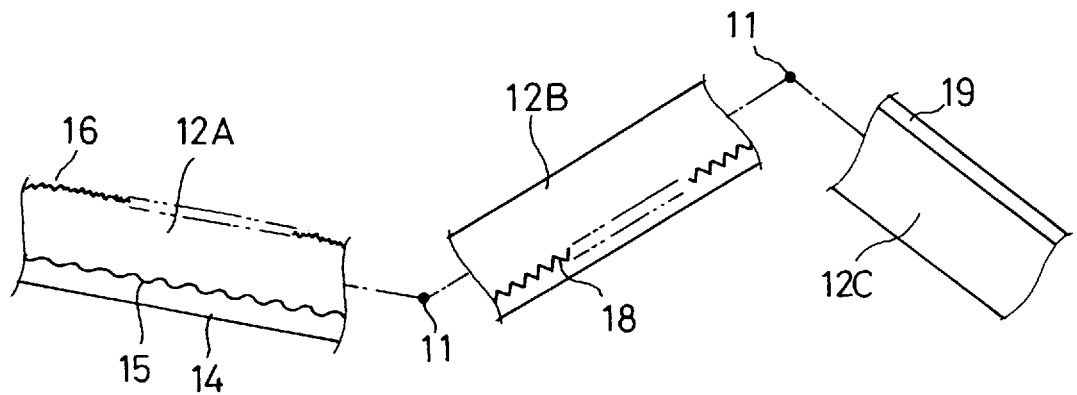
FIG. 6 is a sectional view showing the planar luminescent element of FIG. 5.
Figure 7:
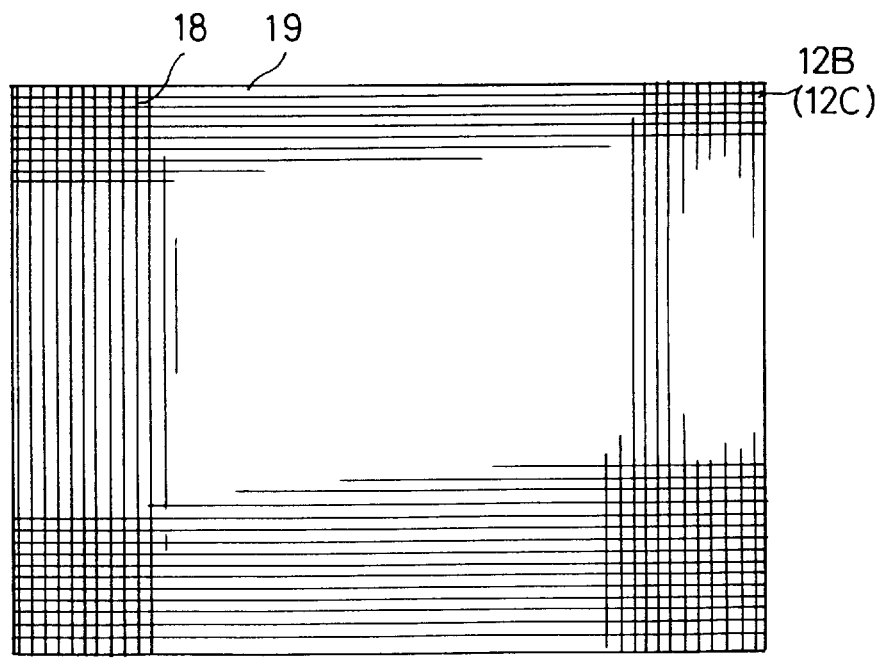
FIG. 7 is a plan view showing the orientation of the pair of prism sheets shown in FIG. 6.

FIGS. 5 and 6 show another embodiment of the present invention, in which the foldable sheet 10 comprises three sheet sections 12A, 12B, 12C connected successively to each other by the folds 11. The sheet section 12A is formed on its outer side with the diffusive pattern 15 which is, in turn, coated with the reflective film 14, and formed on its inner side with the diffusive layer 16. Each of the remaining sheet sections 12B, 12C has one side formed with a prism sheet layer 18 or 19. The prism sheet layers 18, 19 each comprise linear fine irregular angular profiles extending parallel to one another. However, the linear fine irregular angular profiles of the prism sheet layer 18 extend orthogonally to those of the prism sheet 19, as shown in FIG. 7.

Figure 8:
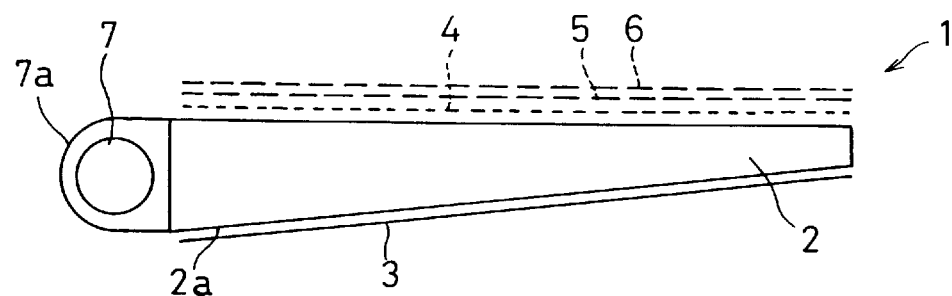
FIG. 8 is a sectional view showing a conventional backlight device.
Figure 9:
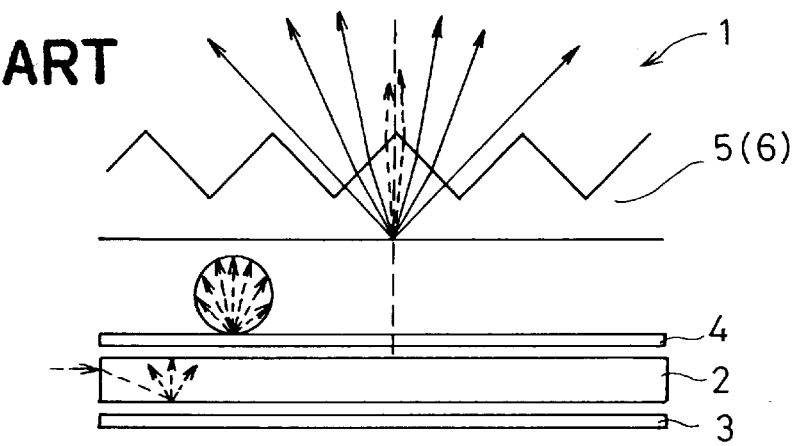
FIG. 9 is a partial sectional view of the conventional backlight device illustrating a manner in which the light rays are guided.

According to the arrangement described hereinabove, an effect similar to the effect obtained by the conventional backlight, mentioned in reference to FIG. 8, can be expected. The embodiment shown in FIGS. 5 and 6 may be modified in a variety of ways. For example, the number of sheet sections 12 may be increased, or the diffusive layer 16 may be formed on only one of the sheet sections. The number of sheet sections 12 may be selectively increased depending on the light distribution characteristic desired. The prism sheet layers 18, 19 may be replaced by linear Fresnel layers formed by cylindrical lenses. In view of the well known fact that a cylindrical Fresnel lens gives a condensing effect in only one of two directions orthogonal to one another, a set of cylindrical Fresnel lenses, having an appropriate focal distance and condensing in mutually orthogonal directions, may be employed to increase a central luminance of the luminescent surface. The cylindrical Fresnel lens comprises fine undulations (irregularities) extending in parallel to one another and has a cross-section similar to those of the prism sheet layers 18, 19.

The type of optically active layers formed on either side of the respective sheet sections 12, as well as the order in which these optically active layers are arranged, are not limited to those adopted in the specific embodiments as have been described above, but may be appropriately selected depending on the light distribution characteristic desired.

As will be apparent from the foregoing description, according to the planar luminescent device and the planar luminescent element provided by the invention, the desired optically active layers may be formed on the respective sheet sections of the foldable synthetic resin sheet and merely folded along the respective folds to obtain the crucial part of the planar luminescent device. Such a feature advantageously contributes to a reduction in the manufacturing cost of the liquid crystal display's backlight. Furthermore, the basic element of the inventive planar luminescent device comprises the individual sections of the synthetic resin sheet which are foldable along the respective folds. This feature allows for a lightweight backlight, particularly suitable for a laptop computer.

What is claimed is:

1. A planar luminescent device comprising:
    a synthetic resin sheet having at least one fold and a plurality of sheet sections foldable along said fold;
    a sheet holder adapted to hold said sheet sections of the sheet folded along said fold in a predetermined accordion-like folded position;
    a reflective layer and a light emitting layer respectively provided on the sheet sections defining opposite ends of the sheet folded and held by the sheet holder; and
    a light source operable to emit light rays and so positioned relative to said sheet that said emitted light rays are directed toward said reflective layer.

2. The planar luminescent device according to claim 1, wherein the reflective layer is formed by coating the associated sheet section with reflective film.

3. The planar luminescent device according to claim 1, wherein the reflective layer is formed by laying a reflective sheet on the associated sheet section.

4. The planar luminescent device according to claim 1, wherein the respective sheet sections are formed on at least one of their front and rear sides with an optically active layer, said optically active layer changing the direction of light incident upon the same.

5. The planar luminescent device according to claim 4, wherein the optically active layer is one of a reflective layer, a diffusive layer, a Fresnel lens layer and a prism sheet layer.

6. The planar luminescent device according to claim 4, wherein the optically active layer provided on the sheet sections comprises at least a reflective layer, a diffusive layer, a first prism sheet layer and a second prism sheet layer arranged in this order.

7. The planar luminescent device according to claim 4, wherein the optically active layer provided on the sheet sections comprise at least a reflective layer, a diffusive layer and a Fresnel lens layer arranged in this order.

8. The planar luminescent device according to claim 1, wherein each said sheet section comprises a rectangular shape.

9. The planar luminescent device according to claim 1, said reflective layer comprises an aluminium powder coating layer.

10. A planar luminescent device comprising:
    a synthetic resin sheet having at least two folds and at least three sheet sections foldable along said folds, each said sheet section having a same rectangular shape;
    a sheet holder adapted to hold said sheet sections of the sheet folded along said fold in a predetermined accordion-like folded position;
    a reflective layer and a light emitting layer respectively provided on the sheet sections defining opposite ends of the sheet folded and held by the sheet holder; and
    a light source provided at one side of the accordion-like folded sheet, parallel with said fold to emit light toward said reflective layer from an open end of the folded sheet sections.

* * * * *